(12) United States Patent
Morris et al.

(10) Patent No.: US 6,286,095 B1
(45) Date of Patent: Sep. 4, 2001

(54) COMPUTER APPARATUS HAVING SPECIAL INSTRUCTIONS TO FORCE ORDERED LOAD AND STORE OPERATIONS

(75) Inventors: Dale C. Morris, Menlo Park, CA (US); Barry J. Flahive, Westford, MA (US); Michael L. Ziegler, Whitinsville, MA (US); Jerome C. Huck, Palo Alto, CA (US); Stephen G. Burger, Santa Clara, CA (US); Ruby B. L. Lee, Los Altos, CA (US); Bernard L. Stumpf, Chelmsford, MA (US); Jeff Kurtze, Nashua, NH (US)

(73) Assignee: Hewlett-Packard Company, Palo Alto, CA (US)

( * ) Notice: Subject to any disclaimer, the term of this patent is extended or adjusted under 35 U.S.C. 154(b) by 1331 days.

(21) Appl. No.: 08/533,878

(22) Filed: Sep. 26, 1995

Related U.S. Application Data

(63) Continuation of application No. 08/234,903, filed on Apr. 28, 1994, now abandoned.

(51) Int. Cl.[7] .................................................... G06F 13/14
(52) U.S. Cl. ............................................. 712/216; 712/23
(58) Field of Search ............................ 395/375, 24, 200, 395/800, 490, 550; 712/23, 216

(56) References Cited

U.S. PATENT DOCUMENTS

| | | | |
|---|---|---|---|
| 4,439,828 | * 3/1984 | Martin | 395/375 |
| 4,985,827 | * 1/1991 | Hamaraka et al. | 395/375 |
| 5,175,829 | * 12/1992 | Stumpf et al. | 395/375 |
| 5,185,871 | 2/1993 | Frey et al. | 395/375 |
| 5,193,167 | * 3/1993 | Sites et al. | 395/425 |
| 5,230,051 | * 7/1993 | Quan | 395/700 |
| 5,261,067 | * 11/1993 | Whelan | 395/425 |
| 5,363,495 | * 11/1994 | Fry et al. | 395/375 |

FOREIGN PATENT DOCUMENTS

| | | | |
|---|---|---|---|
| 0 523337 A2 | 1/1993 | (EP) | G06F/9/46 |
| 2 281422 | 3/1995 | (GB) | G06F/9/38 |

OTHER PUBLICATIONS

Texas Instruments, TMS32010 User's Guide, pp. 3–7, 1983.*

Hennessy et al., Computer Architecture A Quantitative Approach, pp. 13–14, 204–211, 273–277, 574–579.*

Gharachorloo, et al., Memory Consistency And Event Ordering In Scalable Shared–Memory Multiprocessors, 05/28–31/90, The 17th Annula International Symoisium On Computer Architecture, Seattle, WA, IEEE Computer Society Press, pp. 15–26.

IBM Technical Disclosure Bulletin, Procedure For Handling Operand Store Compare Recovery In MSIS, vol. 36, No. 1, 01/93, pp. 451–453.

* cited by examiner

*Primary Examiner*—Eddie Chan
*Assistant Examiner*—Gautam R. Patel
(74) *Attorney, Agent, or Firm*—Howard H. Boyle; David A. Plettner

(57) ABSTRACT

A computer apparatus incorporating special instructions to force load and store operations to execute in program order. The present invention provides a new and novel store instruction that is suspended until all prior store instructions have been completed by an associated CPU. Also, a new load instruction is provided which blocks any subsequent load instructions from executing until this load instruction has been completed by an associated CPU. These instructions allow for high efficiency computer systems to be implemented which optimize instruction throughput by executing subsequent instructions while waiting for a prior instruction to complete.

8 Claims, 13 Drawing Sheets

PROGRAM EXECUTION (SEQUENTIALLY-CONSISTENT)

| TIME | INSTRUCTION PROCESSOR 1 | INSTRUCTION PROCESSOR 2 |
|---|---|---|
| $T_0$ | — | LOAD MAIL FLAG |
| $T_1$ | — | CHECK IF FLAG SET |
| $T_2$ | — | BRANCH (TO MAIL FLAG LOAD) |
| $T_3$ | — | LOAD MAIL FLAG |
| $T_4$ | STORE DATA IN MAIL BOX | CHECK IF FLAG SET |
| $T_5$ | STORE MAIL FLAG | BRANCH (TO MAIL FLAG LOAD) |
| $T_6$ | — | LOAD MAIL FLAG |
| $T_7$ | — | CHECK IF FLAG SET |
| $T_8$ | — | BRANCH (NOT TAKEN) |
| $T_9$ | — | LOAD DATA IN MAIL BOX |

FIG. 2 (PRIOR ART)

PROGRAM EXECUTION

| TIME | PROCESSOR 1 | PROCESSOR 2 |
|---|---|---|
| $T_0$ | — | LOAD MAIL FLAG |
| $T_1$ | — | CHECK IF FLAG SET |
| $T_2$ | — | BRANCH (TO MAIL FLAG LOAD) |
| $T_3$ | — | LOAD DATA IN MAIL BOX |
| $T_4$ | STORE DATA IN MAIL BOX | LOAD MAIL FLAG |
| $T_5$ | STORE MAIL FLAG | CHECK IF FLAG SET |
| $T_6$ | — | BRANCH |
| $T_7$ | — | INSTRUCTION (117) |

*FIG. 3* (PRIOR ART)

PROCESSOR 1

PROGRAM CODE
---
— — —
STORE DATA IN MAIL BOX (103)
STORE MAIL FLAG (105)

PROCESSOR 2

PROGRAM CODE
---
— — —
LOAD MAIL FLAG (109)
CHECK IF FLAG SET (111)
BRANCH IF ≠ FLAG (113)
BARRIER INSTRUCTION (401)
LOAD DATA IN MAIL BOX (115)
(117)
— — —

*FIG. 4A* (PRIOR ART)

PROGRAM EXECUTION

| TIME | PROCESSOR 1 | PROCESSOR 2 |
|------|-------------|-------------|
| T0 | — | LOAD MAIL FLAG |
| T1 | — | CHECK IF FLAG SET |
| T2 | — | BRANCH (IF NOT FLAG) |
| T3 | — | BARRIER INSTRUCTION |
| T4 | STORE DATA IN MAIL BOX | LOAD MAIL FLAG |
| T5 | STORE MAIL FLAG | CHECK IF FLAG SET |
| T6 | — | BRANCH (IF NOT FLAG) |
| T7 | — | BARRIER INSTRUCTION |
| T8 | — | LOAD MAIL FLAG |
| T9 | — | CHECK IF FLAG SET |
| T10 | — | BRANCH (IF NOT FLAG) |
| T11 | — | BARRIER INSTRUCTION |
| T12 | — | LOAD DATA IN MAIL BOX |
| T13 | — | INSTRUCTION (117) |

FIG. 4B (PRIOR ART)

PROCESSOR 1

STORE DATA IN MAIL BOX
BARRIER (601)
STORE MAIL FLAG

PROCESSOR 2

LOAD MAIL FLAG
CHECK IF FLAG SET (603)
BARRIER INSTRUCTION
LOAD DATA IN MAIL BOX

PROCESSOR 2

PROGRAM

| | |
|---|---|
| ORDERED LOAD MAIL FLAG | (1201) |
| CHECK IF FLAG SET | (1203) |
| BRANCH IF NOT FLAG | (1205) |
| LOAD DATA IN MAIL BOX | (1207) |
| STORE DATA XXX | (1209) |

EXECUTION

| | | |
|---|---|---|
| $T_0$ | LOAD MAIL FLAG (NOT VALID) | (1201) |
| $T_1$ | CHECK FLAG (FLAG NOT VALID) | (1203) |
| $T_2$ | BRANCH | (1205) |
| $T_3$ | STORE DATA XXX | (1209) |
| $T_4$ | ORDERED LOAD MAIL FLAG (VALID) | (1201) |
| $T_5$ | CHECK FLAG (VALID) | (1203) |
| $T_6$ | BRANCH | (1205) |
| $T_7$ | LOAD DATA IN MAIL BOX | (1207) |

US 6,286,095 B1

COMPUTER APPARATUS HAVING SPECIAL INSTRUCTIONS TO FORCE ORDERED LOAD AND STORE OPERATIONS

CROSS REFERENCE TO RELATED APPLICATIONS

This is a continuation of application Ser. No. 08/234,903 filed on Apr. 28, 1994, now abandoned.

BACKGROUND

Early digital computers incorporated a single central processing unit (CPU) which was responsible for executing instructions in a program to perform some result. These uniprocessor systems generally have a very simple model of processor execution. That is, the CPU executes instructions in a way so that it appears to a programmer that the hardware is executing the instructions one at a time and in the order the instructions appear in the particular program being executed. This is called "program order" execution and is still in wide use today in personal computers etc.

To achieve greater speed, computer designers combine multiple CPUs in the same computer system. This allows the computer to execute faster as each CPU executes part of a program concurrently instead of a single CPU having to execute all of the program in sequence.

In order for the multiple CPU systems to work effectively, the CPUs must be able to communicate back and forth. Commonly, CPUs communicate through the use of shared memory that is accessible to each. One example of how shared memory can be used for communications is a "mailbox" scheme, which will be used here to illustrate the present invention. In multiple CPU computers, often one CPU is performing an operation where the result of the operation will be used by another CPU. One way the CPUs can communicate is by using a "mailbox" with a "flag". That is, a location in memory is designated as the mailbox where a first CPU puts data for a second CPU to use. The second CPU reads a specified memory location to look for a particular bit pattern (the flag) which tells the second CPU that valid data is available in the mailbox for it to use. To understand the present invention, an understanding of how the mailbox process works is useful.

FIGS. 1 and 2 illustrate a mailbox communication technique between two CPUs. FIG. 1 illustrates a section of program code processor 1 will execute 101 with two instructions detailed. The first instruction 103 causes processor 1 to store data in the mailbox location. While the second instruction 105 causes processor 1 to set the mailbox flag. A section of program code processor 2 will execute is shown 107 with four instructions detailed. The first instruction 109 causes processor 2 to load the mail flag and the second instruction 111 causes processor 2 to test the flag to see if it is set (indicating there is valid data in the mailbox). Branch instruction 113 causes processor 2 to loop back and reload the mail flag (instruction 109) if the flag was not set (as determined by instruction 111). If the flag was set, then processor 2 will continue past the branch instruction 113 and execute the next instruction 115 which causes processor 2 to load the data in the mailbox.

An example of the execution of the instructions shown in FIG. 1 by processors 1 and 2 is illustrated in FIG. 2. These are "sequentially-consistent" CPUs which means they execute all instructions in program order and no later operation is performed until all prior operations are complete. Processor 1 stores data in the mailbox (instruction. 103) at time $T_4$ and then stores the mail flag (instruction 105) at time $T_5$. During the period indicated by time $T_0-T_3$, processor 1 would be executing other instructions not illustrated. In this example, processor 2 loads the mail flag (instruction 109) at time $T_0$ and checks to see if the flag is set (instruction 111) at time $T_1$. The branch instruction (113) is executed at time $T_2$ and since the flag has not yet been set by processor 1, the branch instruction causes processor 2 to branch to the load mail flag instruction 109 and reload the mail flag at time $T_3$. The flag is checked again at time $T_4$ and since the flag is still not set yet the branch instruction causes processor 2 to branch back again to the load mail flag instruction which is executed at time $T_6$. The flag is rechecked at time $T_7$ and since the flag was set by processor 1, the branch instruction executed at time $T_8$ does not cause processor 2 to branch so processor 2 now loads the data in the mailbox (instruction 115) at time $T_9$.

In this example, processor 2 is assured of loading the proper mailbox data as processor 2 does not load from the mailbox until processor 1 has stored the mailbox data and set the flag.

While program order execution, as illustrated in FIG. 2, is still a useful execution method, it has limitations. Program order execution requires all instructions to be completed in order. Therefore if a preceding instruction cannot be completed, no later instruction can be performed. Unfortunately it is often that a particular instruction cannot be performed immediately. For example, an input/output (I/O) instruction may not be immediately executable because the I/O device is not ready with the required data. So while the CPU is waiting for the I/O device, a later instruction that could be executed must wait. In high performance computer systems such inefficiency is intolerable.

To address this bottleneck, computer designers have designed CPUs which can execute a later instruction before an unrelated prior instruction is competed. These CPUs do not maintain sequential consistency. While eliminating the constraints imposed by sequential consistency has performance benefits, it also creates problems in multiprocessor computers. For example, if a CPU is allowed to perform a later operation before all prior operations are complete, communications by using the mailbox and flag technique can fail.

A simple example of the multiprocessor mailbox problem is illustrated in FIG. 3 showing the instructions detailed in FIG. 1 being executed by CPUs which do not always execute instructions in a sequentially consistent way. Processor 1 performs two operations. The first operation 103 is to store data in the mailbox during time $T_4$ and the second operation is to store the mail flag 105 during time $T_5$. Processor 2 loads the mail flag at time $T_0$ (109) and then checks to see if the mail flag is set 111 during time $T_1$. However the mail flag will not be stored by processor 1 until $T_5$ and so the flag test performed by processor 2 will fail and the branch instruction 113 executed at time $T_2$ will cause processor 2 to loop back to the mail flag load. If the processor cannot immediately load the mail flag, for example it is not in cache but in main memory, the processor suspends execution of the mail flag load. However since processor 2 can perform the subsequent load of the mailbox data 115 it does so (the CPU "speculates" that this instruction will need to be performed later and therefore performs the load to save time). The CPU completes the reload of the mail flag at time $T_4$ and retests the flag at time $T_5$. On this second try, processor 2 will find the flag set and therefore the branch instruction executed at time $T_6$ will not cause processor 2 to branch. Since processor 2 already completed the load of data from the mailbox during $T_3$, the processor will not redo the load (it assumes its speculation was correct) but will continue on and execute the subsequent instruction 117 in the program. However, processor 2 will have read invalid data in the mailbox. This is an unacceptable result.

So some means must be made available to the programmer such that proper execution of a program can be assured. The programmer must be able to force the multiprocessor system to execute instruction sequentially and not perform a subsequent operation until a prior operation is complete. Prior art systems have resolved this problem by using a "barrier" instruction. This instruction prevents any operations after the barrier instruction from being performed before all operations preceding the barrier instruction are complete. It should be noted that although a load or store operation is begun in program order, common design practices can cause them to complete out of order. That is, a later started operation can complete before a prior operation completes.

FIGS. 4A and 4B illustrate the use of a barrier instruction to prevent the problem illustrated in FIG. 3 from occurring. FIG. 4A lists the portions of a program each CPU will execute and is the same as discussed before with the addition of a barrier instruction 401 placed before the "load data in the mailbox instruction" 115. Processor 1 performs operations 103 and 105 during times $T_4$ and $T_5$ respectively. Processor 2 performs the same operations in $T_0$–$T_2$ as discussed in association with FIG. 3. However a barrier instruction 401 has been added after the branch instruction 113 and before the load data in the mailbox instruction 115. Therefore after processor 2 tests the flag and finds the flag is not set, the barrier instruction prevents processor 2 from "speculating" and loading the data in the mailbox forcing the processor to complete the flag load and test operation before continuing. Even if the reload of the mail flag was delayed and the processor could have loaded the mailbox data, the barrier instruction forces the processor to complete all pending instructions before continuing. The loading of data from the mailbox is finally accomplished at time $T_{12}$ at which time the mailbox data is valid. Using the barrier instruction has prevented processor 2 from loading invalid data from the mailbox. This example shows thirteen time units being used and one instruction per CPU per time unit being executed. However, different CPU hardware designs may take more or less relative time to execute the same instructions.

While the problem with load operations has been illustrated in FIG. 3, the same problem occurs with store operations. An example of the store problem is illustrated in FIG. 5. In this example, it is possible that processor 1 would not be able to store data into the mailbox (501) at time $T_0$ but would be able to store the flag (503) at time $T_1$. This might occur if the mailbox memory was unavailable to processor 1 for some reason. If processor 1 stores the flag at time $T_1$, processor 2 will read the flag and then load invalid data from the mailbox. The mailbox data is invalid as processor 1 did not store the mailbox data until time $T_4$.

So as a practical matter, prior art computer systems use a barrier instruction before the flag store (601) and before any loads from a mailbox (603) as illustrated in FIG. 4. Unfortunately, a barrier instruction forces the CPU to wait until all prior instructions are completed before continuing past the barrier. This may be inefficient in many cases. For example, if a barrier is used to insure a load is performed properly, the barrier will also prevent a subsequent store unrelated to the protected load from occurring. The reverse can also be true when a store operation is protected by a barrier instruction. Additional inefficiency is introduced by the use of barrier instructions because it takes some time for the CPU to execute a barrier instruction.

What is needed in the industry is a way to protect store operations without affecting load operations or protect load operations without affecting store operations and do so without requiring additional CPU time.

SUMMARY OF THE INVENTION

The present invention overcomes the aforementioned problems by providing new and novel computer instructions. A new store instruction is provided that prevents the CPU from performing its store operation until all preceding store operations are completed. In like manner a new load instruction is provided that prevents the CPU from performing subsequent load operations until its load operation is completed.

A CPU store instruction is encoded such that a store command is combined with a store barrier command. The result is a single instruction that can be executed by a CPU in the same amount of time that a store instruction without a barrier is executed. A CPU load instruction is also encoded such that a load instruction is combined with a load barrier instruction and is executed in the same number of CPU cycles as a load instruction without a barrier instruction. These new instructions are identified as "ordered loads" and "ordered stores".

By utilizing these new and novel instructions, a programmer can force the computer system to execute instructions in a way that insures the correct data is used by the CPUs when mailbox and like transactions are performed. In addition, the new instructions provide the needed synchronization while, at the same time, allowing the CPU to execute subsequent unrelated operations, and postpone earlier unrelated operations, thereby improving the overall efficiency of the associated computer system. Further, the prior time penalties associated with barrier instructions is overcome.

BRIEF DESCRIPTION OF THE DRAWINGS

FIG. 2 illustrates the execution of the commands shown in FIG. 1.

FIG. 3 illustrates the execution of the commands shown in FIG. 1 by non-sequentially consistent CPUs.

FIG. 4A illustrates a partial instruction flow for two CPUs using mailbox communications and incorporating a barrier instruction.

FIG. 4B illustrates a prior art use of a barrier instruction before a mailbox load operation.

FIG. 6 illustrates a prior art use of barrier instructions before a flag store operation and a load mailbox operation.

FIG. 12 illustrates an exemplary use of an ordered load instruction.

DETAILED DESCRIPTION OF THE INVENTION

The Hewlett-Packard Precision Architecture Reduced Instruction Set Computer (PA-RISC) architecture and instruction set is well known in the art. The "PA-RISC 1.1 Architecture and Instruction Set Reference Manual", HP part number 09740-90039, published by Hewlett-Packard Co., Palo Alto, Calif. is a publicly available book which describes the PA-RISC architecture and instruction set and is hereby incorporated by reference.

The present invention provides two new computer instructions: an "ordered load" and an "ordered store". While these instructions are useful in many computer systems, they are particularly useful in computers employing the PA-RISC architecture. These instructions are encoded as is normal for a PA-RISC 1.1 instruction and a special instruction detector detects when those instructions are utilized. When one of these new instructions is detected, the detector forces the CPU to perform an ordered load or store operation.

Figure 1:
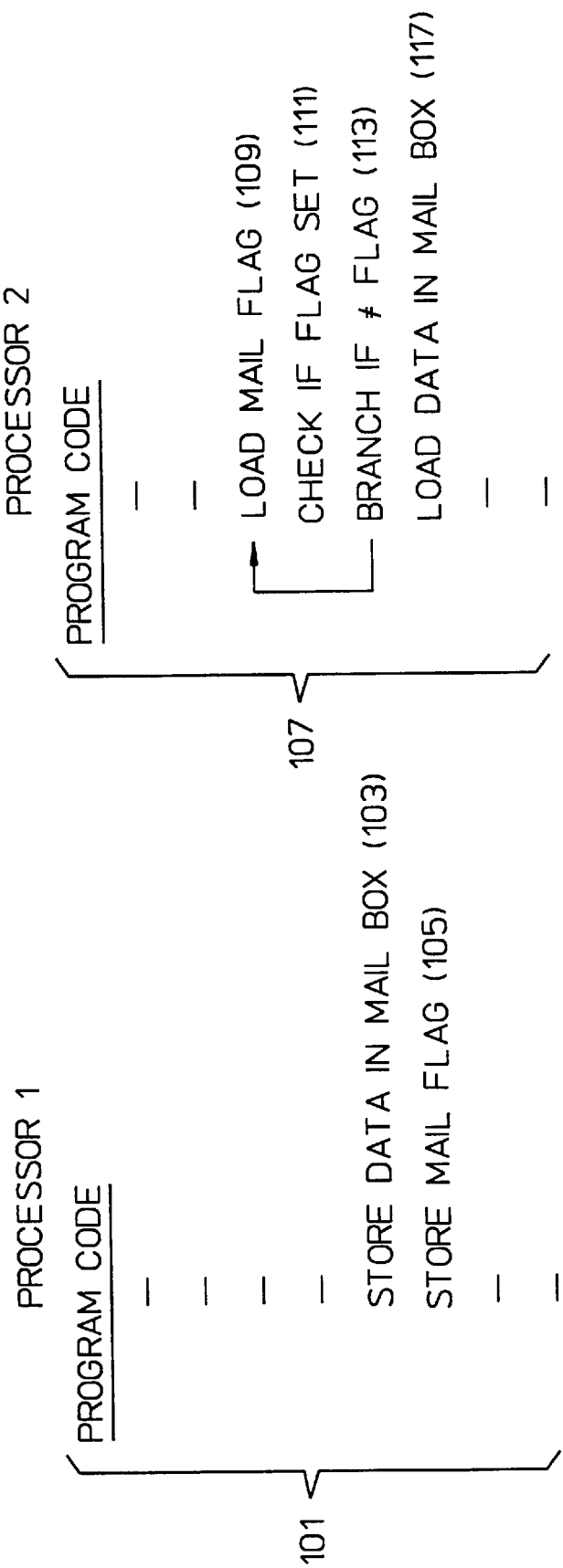
FIG. 1 illustrates a partial instruction flow for two independent CPUs using mailbox communications.
Figure 5:
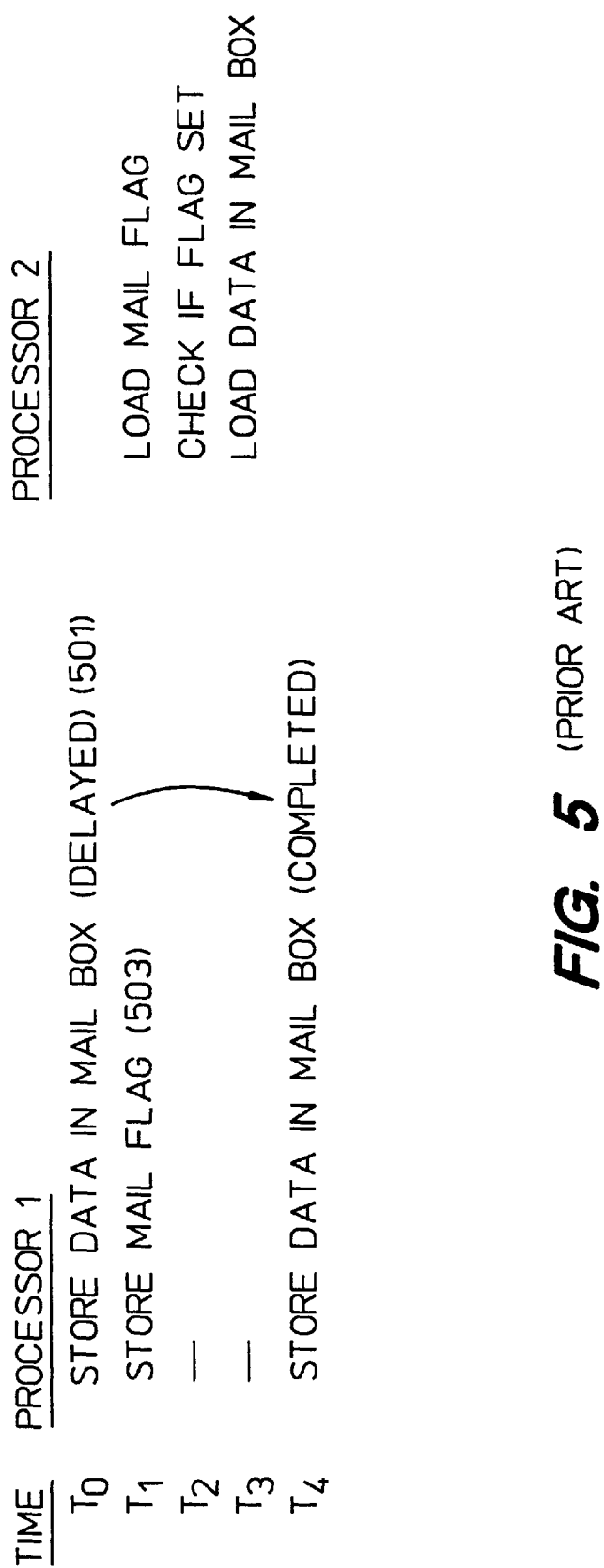
FIG. 5 illustrates a partial instruction flow for two independent CPUs with the first CPU having a mailbox store operation delayed.
Figure 7:
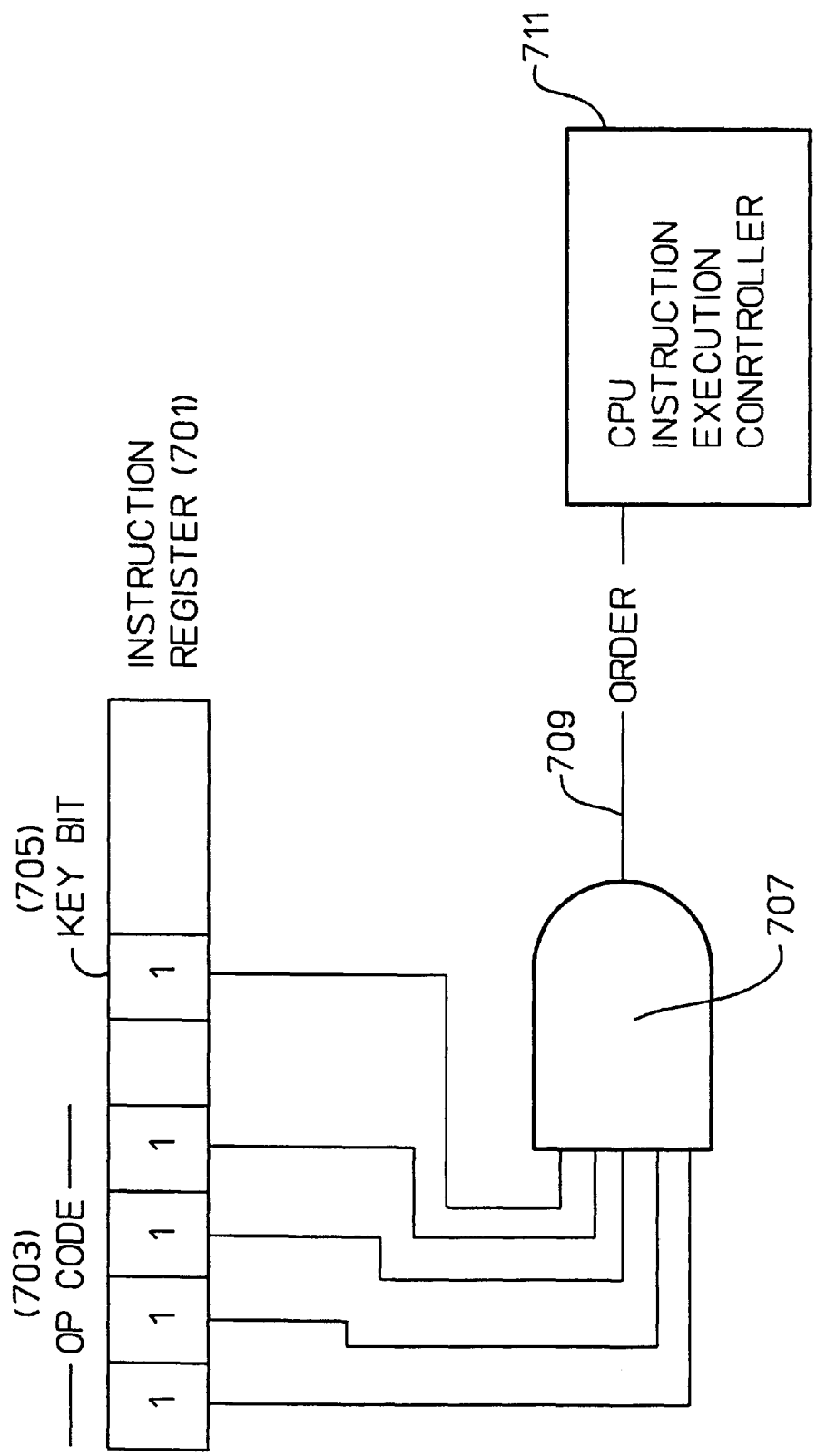
FIG. 7 illustrates a simplified ordered store instruction detection apparatus.

FIG. 7 illustrates a simplified view of the detection process. An instruction register 701 holds an instruction having an op-code 703 and a key bit 705. By definition, in this example, an instruction having an op-code of "1111" and a key bit of "1" is an ordered store operation. An "and" gate 707 detects when all of the op-code bits and the key bit are "1s". When this condition is detected, the "and" gate outputs a "1" on "order" line 709. A CPU instruction execution controller 711 monitors the order line 709 and suspends the current store operation until all prior store operations are completed.

Figure 8:
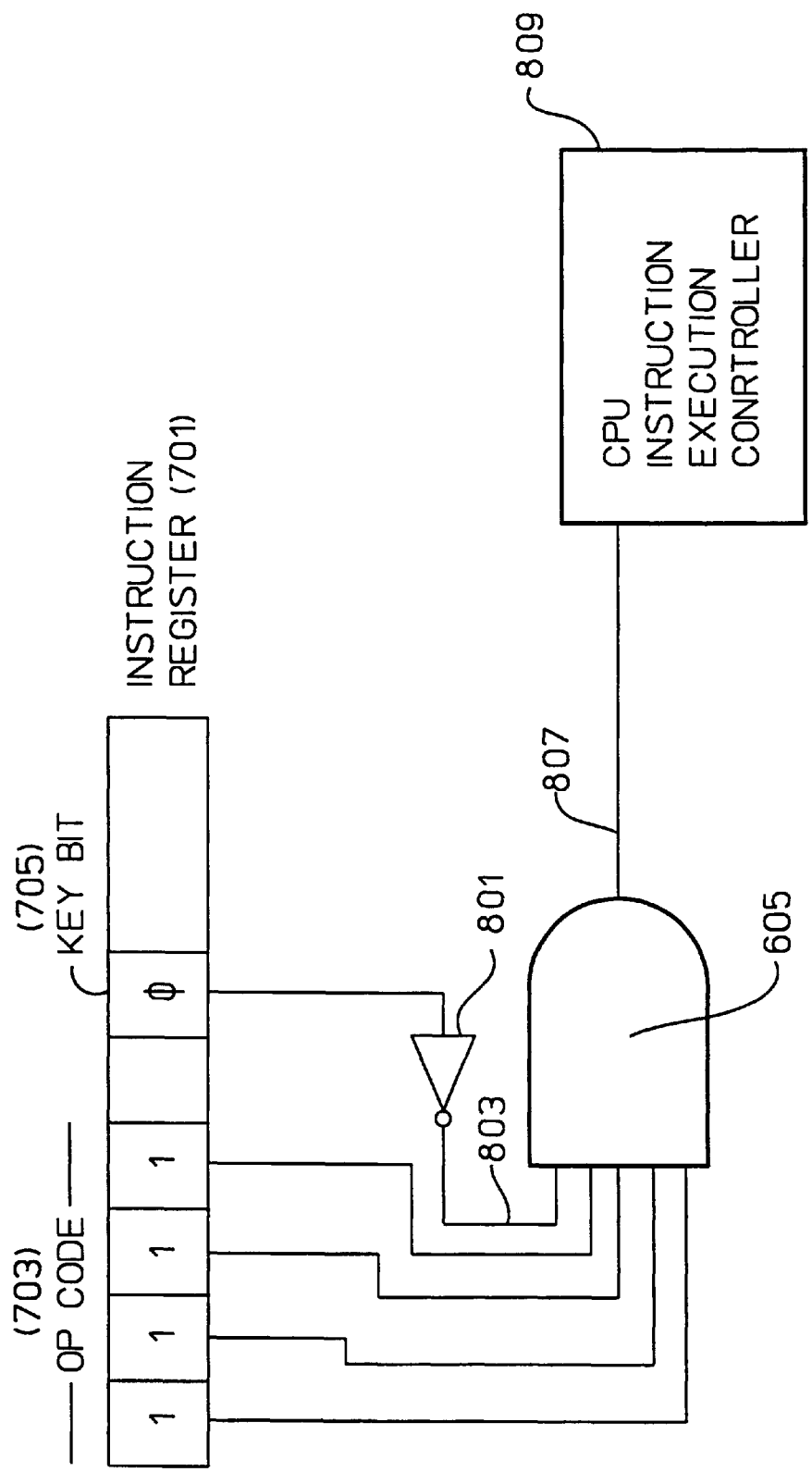
FIG. 8 illustrates a simplified ordered load instruction detection apparatus.

FIG. 8 illustrates a simplified view of the detection process for detecting an ordered load operation. As before, the instruction register 701 holds an instruction with and op-code 703 and a key bit 705. By definition, in this example, an instruction having an op-code of "1111" and a key bit of "0" is an ordered load instruction. An inverter gate 801 inverts the contents in the key bit location 705 and provides an input 803 to an "and" gate 805. The bits in op-code 703 are also fed into the "and" gate 805. When the "and" gate detects that all op-code bits are "1s" and the key bit is a "0", the "and" gate outputs a "1" on the "order" line 807. A CPU instruction execution controller monitors the order line 807 and suspends all subsequent load operations until the prior load operation is completed.

Figure 9:
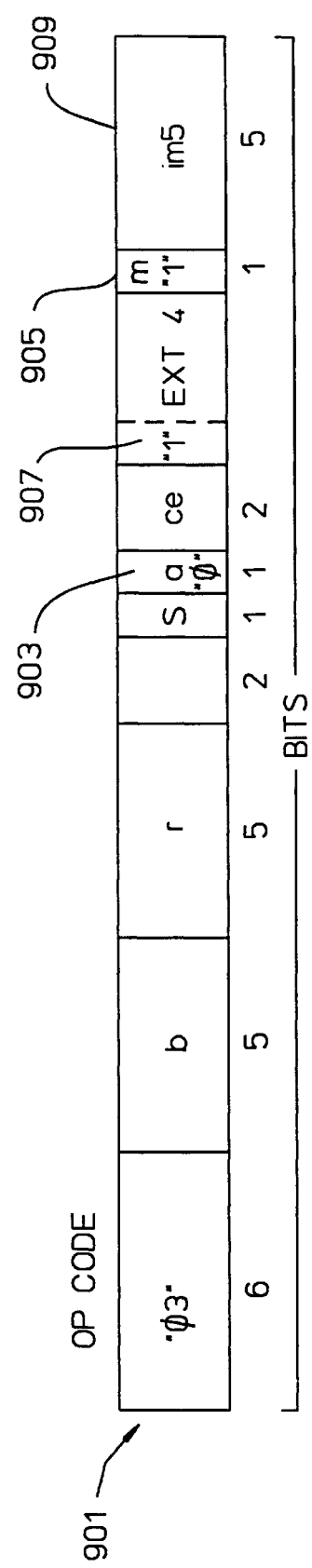
FIG. 9 illustrates a preferred encoding of an ordered store instruction.

The new instructions can advantageously be encoded in any fashion optimal for a particular computer architecture as is well known by those skilled in the art. Also, the instruction detection means will necessarily take many forms depending on the particular architecture without departing from the advantages herein described. For the PA-RISC architecture, the "ordered store" instruction is encoded as illustrated in FIG. 9. While many fields are shown, the fields pertinent to this discussion are the "op-code" field 901, the "a" field 903, the "m" field 905 and the first bit 907 of field "ext4" and the displacement field 909 "im5". For an ordered store, the op-code is "03", the "a" field is "0" the "m" field is "1", the first bit of the "ext4" field is "1" and the "im5" field is "0". The other fields have the same meaning and purpose as described in chapter 5 of the PA-RISC 1.1 architecture Reference Manual.

Figure 10:
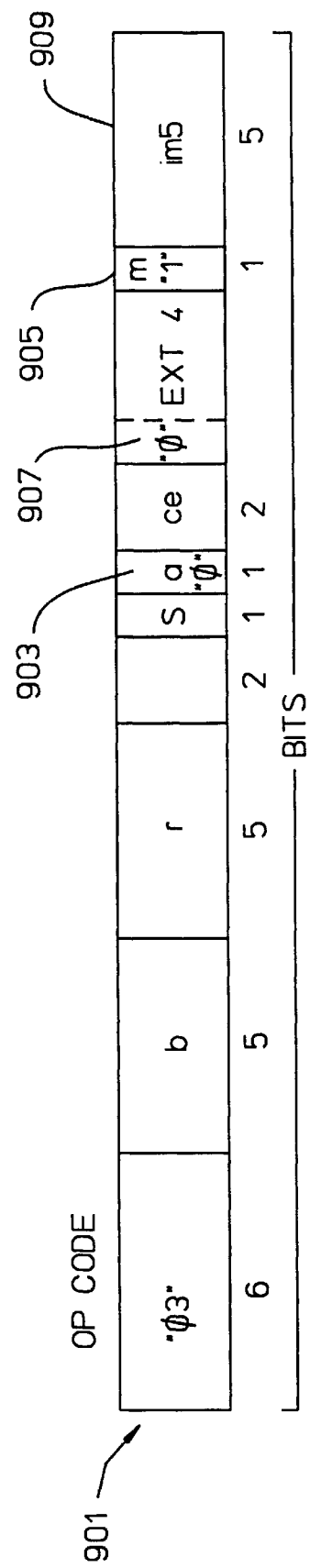
FIG. 10 illustrates a preferred encoding of an ordered load instruction.

FIG. 10 illustrates the encoding for the "ordered load" instruction. Again the op-code 901 is "03", the "a" field 903 is "0", the "m" field 905 is "1" and the "im5" field is 0. This instruction is differentiated from the ordered store by the first bit of the "ext4" field 907 being "0". In the preferred embodiment, an "ordered load" is defined as a load command that specifies that the base register is to be modified (m=1) with the modification to occur after the load (a=0) with the base register being modified by adding 0 (Base Reg=Base Reg +0). This allows a program utilizing the new instructions to be run on older fully sequential PA-RISC computers and still perform properly as the ordered load and store instructions will be decoded as normal load and store operations.

Figure 11:
FIG. 11 illustrates an exemplary use of an ordered store instruction.

FIG. 11 illustrates the use of an ordered store instruction as applied to storing data in a mailbox and setting a flag. Processor 1 is programmed to execute three instructions, a mailbox store 1101, a flag store 1103 and a data load 1105 where the data load 105 is unrelated to the flag store 1103. As shown, the data store to the mailbox is delayed and cannot be completed at time $T_0$ and does not complete until time $T_3$. While waiting for the mailbox command to complete, the processor moves to the next instruction which is an ordered store 1103 used to store the mailbox flag. However since there is a prior store instruction pending, the ordered store is suspended until after the pending mailbox store is completed. Therefore the mail flag ordered store is completed at time $T_4$. Since the third instruction 1105 is a load instruction, the processor executes the instruction at time $T_2$ as load instructions are unaffected by the ordered store command 1103.

FIG. 12 illustrates the use of an "ordered load" instruction where an "ordered load" prevents the CPU from executing a subsequent load until the CPU completes the "ordered load". Processor 2 is programmed to execute five instructions, an "ordered load" mail flag 1201, check flag instruction 1203, a branch (on not flag) instruction 1205, a load from a mailbox 1207 and a data store 1209 where the data store 1209 is unrelated to the load 1207. At time $T_0$ processor 2 loads the mail flag 1201. At time $T_1$, the processor tests the flag to see if it is set indicating there is valid data in the mailbox. Assuming for this example the flag is not set, the branch instruction 1205 causes the CPU to branch back to reload the mail flag. If the CPU cannot do the reload immediately, then the CPU tries to perform the next instruction while waiting for the mail flag load to complete. Since the next instruction 1207 is a load command and the mail flag load was an "ordered load", the CPU will not execute the mailbox load and will instead perform the store command 1209 at time $T_3$. At time $T_4$ the ordered load of the mail flag completes and the flag is rechecked at time $T_5$. Assuming the flag is now valid, a branch does not occur and the data in the mailbox is loaded at time $T_7$.

The novel ordered load and store instructions and usage now allows a programmer to insure particular instructions are executed in a specific order while still allowing the computer to continue executing different types of instructions. This flexibility is achieved without requiring additional CPU time to execute multiple instructions and therefore represents a major efficiency improvement over prior art designs. While the new instructions have been illustrated in one limited use, mailbox communications, they enable computer hardware design approaches not practical before. For example, a computer can now be designed that starts instructions out of order without having to throwaway work when there is a risk of mis-synchronization between two CPUs. It is common for a CPU to start instructions out of order. However, if the CPU gets a request for a piece of data the CPU holds, and the CPU performed an operation on the data out of order, the CPU cannot take the risk of passing invalid data to another CPU and must throwaway any out-of-order work and redo the work in-order. If the data was valid, then the CPU wasted time redoing the work in sequence and the other CPU making the request had to wait for the work to be redone. Since the loads and stores that must be performed in order are now known, all other load and store operations can be performed out of order without the risk of synchronization problems between CPUs. The use of "non-blocking" caches and "non-coherent store buffers" is also easier as operations that miss in the cache can be queued and other operations that "hit" in the cache can be completed without synchronization problems between CPUs.

While the preferred embodiment is described in association with the PA-RISC architecture, other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. A method of ordering load operations performed by a CPU executing a stream of instructions, wherein the stream of instructions are in a program order and include load instructions and store instructions, and the load instructions each perform a load operation, the method comprising:

detecting an ordered load instruction in the stream of instructions;

preventing the CPU from executing a load instruction subsequent in the program order to the ordered load instruction prior to the load operation requested by the ordered load instruction being completed by the CPU; and allowing the CPU to not execute a load instruction preceding in the program order the ordered load instruction prior to the load operation requested by the ordered load instruction being completed by the CPU.

2. The method of claim 1 wherein detecting an ordered load instruction in the stream of instructions comprises:

reading an instruction in an instruction register;

comparing an operations code "op-code" field in the instruction to a predetermined load code to detect that the instruction is a load instruction; and comparing at least one additional field in the instruction to a predetermined code to detect that the instruction is an ordered load instruction.

3. The method of claim 1 wherein detecting an ordered load instruction in the stream of instructions comprises:

reading an instruction in an instruction register;

detecting that the instruction specifies that a load operation is to be performed by the CPU;

detecting that the instruction specifies that a base register is to be modified;

detecting that the instruction specifies that the modification of the base register is to occur after the load operation is complete; and detecting that the instruction specifies that the base register is to be modified by adding "0" to the register (Reg=Reg+0).

4. A method of ordering store operations performed by a CPU executing a stream of instructions, wherein the stream of instructions are in a program order and include load instructions and store instructions and the store instructions each perform a store operation, the method comprising:

detecting an ordered store instruction in the stream of instructions;

preventing the CPU from executing the ordered store instruction before the store operations requested by all store instructions preceding in the program order the ordered store operation are completed by the CPU and;

allowing the CPU to execute a store instruction subsequent in the program order to the ordered store instruction prior to the store operation requested by the ordered store instruction being completed by the CPU.

5. The method of claim 4 wherein detecting an ordered store instruction in the stream of instructions further comprises:

reading an instruction in an instruction register;

comparing an operations code "op-code" field in the instruction to a predetermined store code to detect that the instruction is a store instruction; and comparing at least one additional field in the instruction to a predetermined code to detect that the instruction is an ordered store instruction.

6. The method of claim 4 wherein detecting an ordered store instruction in the stream of instructions further comprises:

reading an instruction in an instruction register;

detecting that the instruction specifies that a store operation is to be performed by the CPU;

detecting that the instruction specifies that a base register is to be modified;

detecting that the instruction specifies that the modification of the base register is to occur after the store operation is complete; and detecting that the instruction specifies that the base register is to be modified by adding "0" to the register (Reg=Reg+0).

7. A digital computer having an instruction execution means for executing instructions from a stream of instructions, including load and store instructions, wherein the stream of instructions are in a program order, the digital computer comprising:

detection means for detecting an ordered store or an ordered load instruction in the stream of instructions; and control means, connected with the detection means, to control the instruction execution means as follows:

if an ordered load instruction is detected, the control means controls the instruction execution means such that a load instruction subsequent in the program order to the ordered load instruction is not executed prior to the ordered load instruction load being completed by the instruction execution means, while execution of load instructions preceding in the program order the ordered store instruction need not occur before execution of the ordered load instruction is complete; or if an ordered store instruction is detected, the control means controls the instruction execution means such that the ordered store instruction is not executed prior to a store instruction preceding in the program order the ordered store operation being completed, while execution of store instructions subsequent in the program order is allowed.

8. The digital computer of claim 7 wherein the detection means detects an ordered store or an ordered load instruction by reading an instruction in an instruction register and determining that the instruction is a load or store instruction and then comparing at least one field of the instruction to a predetermined code to detect that the instruction is an ordered load or store instruction.

* * * * *

UNITED STATES PATENT AND TRADEMARK OFFICE
CERTIFICATE OF CORRECTION

PATENT NO.     : 6,286,095 B1
DATED          : September 4, 2001
INVENTOR(S)    : Morris et al.

It is certified that error appears in the above-identified patent and that said Letters Patent is hereby corrected as shown below:

<u>Column 8,</u>
Line 51, delete "complete" and insert therefor -- completed --

Signed and Sealed this

Twenty-eighth Day of January, 2003

JAMES E. ROGAN
*Director of the United States Patent and Trademark Office*